(12) United States Patent
Weppler et al.

(10) Patent No.: US 9,191,444 B2
(45) Date of Patent: Nov. 17, 2015

(54) INTELLIGENT NETWORK MANAGEMENT OF NETWORK-RELATED EVENTS

(75) Inventors: Cory R. Weppler, Ottawa (CA); Mira Vrbaski, Kanata (CA); Lui Chu Yeung, Kanata (CA); Haiqing Ma, Nepean (CA); Gita Beyk, Ottawa (CA)

(73) Assignee: Alcatel Lucent, Boulogne-Billancourt (FR)

(*) Notice: Subject to any disclaimer, the term of this patent is extended or adjusted under 35 U.S.C. 154(b) by 405 days.

(21) Appl. No.: 13/156,876

(22) Filed: Jun. 9, 2011

(65) Prior Publication Data

US 2012/0317269 A1    Dec. 13, 2012

(51) Int. Cl.
| | |
|---|---|
| *H04L 29/08* | (2006.01) |
| *H04L 12/24* | (2006.01) |
| *H04W 24/08* | (2009.01) |
| *H04L 12/891* | (2013.01) |
| *H04M 15/00* | (2006.01) |
| *H04W 24/04* | (2009.01) |
| *H04L 12/801* | (2013.01) |
| *H04L 12/851* | (2013.01) |

(52) U.S. Cl.
CPC ............ *H04L 67/14* (2013.01); *H04L 41/0654* (2013.01); *H04L 41/0663* (2013.01); *H04L 41/0893* (2013.01); *H04L 47/41* (2013.01); *H04M 15/66* (2013.01); *H04W 24/08* (2013.01); *H04L 41/0896* (2013.01); *H04L 47/115* (2013.01); *H04L 47/14* (2013.01); *H04L 47/2408* (2013.01); *H04L 47/2441* (2013.01); *H04W 24/04* (2013.01)

(58) Field of Classification Search
CPC ........................................................ H04L 67/14
USPC ........................................................ 709/224
See application file for complete search history.

(56) References Cited

U.S. PATENT DOCUMENTS

| | | | |
|---|---|---|---|
| 7,793,263 B2* | 9/2010 | Farchi et al. ................... | 717/126 |
| 2005/0125688 A1* | 6/2005 | Ogawa et al. .................. | 713/200 |
| 2006/0126509 A1* | 6/2006 | Abi-Nassif et al. ............ | 370/235 |
| 2008/0102853 A1* | 5/2008 | Kagimoto et al. ............. | 455/453 |
| 2009/0116476 A1* | 5/2009 | Halbraich et al. ............. | 370/352 |
| 2010/0115242 A1* | 5/2010 | Yamada ......................... | 712/220 |
| 2010/0238803 A1* | 9/2010 | Racz et al. ..................... | 370/235 |

* cited by examiner

*Primary Examiner* — Shaq Taha
(74) *Attorney, Agent, or Firm* — Kramer & Amado, P.C.

(57) ABSTRACT

Various exemplary embodiments relate to a method and related network node including one or more of the following: receiving, at the network node, an indication of an event from a network monitor, the event associated with a network element; identifying an applicable rule of a plurality of rules based on the event, the applicable rule specifying at least one action; initiating performance of the at least one action with respect to at least one session associated with the network element. Various embodiments additionally include one or more of the following: identifying a group of sessions associated with the network element; and wherein the steps of identifying an applicable rule and initiating performance of the at least one action are performed for each session of the group of sessions.

19 Claims, 5 Drawing Sheets

500

| | Network Monitor Event | | |
|---|---|---|---|
| 505 | | | |
| 510 | Criteria | Result | ← 515 |
| 520 | Event = "P2P Mobile" | Throttle P2P Sessions 10% | |
| 525 | Event = "High Usage Subscriber" AND Any NE for Subscriber is Congested | Move Session to Different NE | |
| 530 | Event = "NE Congested" | Reauthorize Session on NE | |
| 535 | ... | ... | |
| | Session Establishment | | ← 540 |
| | Criteria | Result | |
| 545 | Subscriber is High Usage Subscriber | Throttle Sessions 50% | |
| 550 | NE is Congested AND Subscriber Category = "Gold" | Establish Session | |
| 555 | NE is Congested | Throttle Session 80% | |
| 560 | ... | ... | |
| | ... | | ← 565 |

300

| | Network Element ID | Congestion | Active Mobiles | Signaling Events | Failures |
|---|---|---|---|---|---|
| 330 | 0x4E33 | {0x73AB} | 15 | 23 | 4 |
| 340 | 0x73AB | {0x4E33; 0x540D} | 65 | 43 | 5 |
| 350 | 0xF406 | {} | 9 | 24 | 1 |
| 360 | ... | ... | ... | ... | ... |

305 — Network Element ID
310 — Congestion
315 — Active Mobiles
320 — Signaling Events
325 — Failures

| | Subscriber ID | Anomalies |
|---|---|---|
| 420 | 0x563C90 | {High Usage Subscriber} |
| 430 | 0x7EF521 | {P2P Mobile; Port Scan Horizontal} |
| 440 | ... | ... |

405 — Subscriber ID
410 — Anomalies

| Network Monitor Event | | |
|---|---|---|
| Criteria | Result | |
| Event = "P2P Mobile" | Throttle P2P Sessions 10% | |
| Event = "High Usage Subscriber" AND Any NE for Subscriber is Congested | Move Session to Different NE | |
| Event = "NE Congested" | Reauthorize Session on NE | |
| ... | ... | |
| Session Establishment | | |
| Criteria | Result | |
| Subscriber is High Usage Subscriber | Throttle Sessions 50% | |
| NE is Congested AND Subscriber Category = "Gold" | Establish Session | |
| NE is Congested | Throttle Session 80% | |
| ... | ... | |
| ... | | |

*FIG. 5*

INTELLIGENT NETWORK MANAGEMENT OF NETWORK-RELATED EVENTS

CROSS-REFERENCE

This application is related to the following co-pending application, incorporated by reference herein: U.S. application Ser. No. 13/156,787, "INTELLIGENT NETWORK MANAGEMENT OF SUBSCRIBER-RELATED EVENTS" to Weppler et al.

TECHNICAL FIELD

Various exemplary embodiments disclosed herein relate generally to network management.

BACKGROUND

As mobile telecommunication becomes more widely accepted and as more complex applications are developed, the demand on network infrastructure is ever-increasing. While service providers attempt to keep up with the increased need for bandwidth and generally reliable service by installing faster and additional equipment, it appears that such service may be difficult to provide while network traffic remains unregulated. In particular, two major factors that contribute to reduced end-user experience are congested network elements and unfair use of the network by certain users.

In many networks, there are multiple routes between two communication endpoints through many different intermediate devices. Without a way to assess the congestions of different routes, however, a particular session may be routed through an over-worked or failing node, leading to an appreciable delay in data transfer. In many of these cases, sessions could have been routed through other underutilized nodes, thereby providing better transfer rates for those sessions while reducing the load on the congested nodes.

Individual users may also have an adverse effect on the quality of service delivered to other users. For instance, if a user consistently uses a high amount of data transfer, such as in the case of streaming high quality video and/or downloading large files, this detracts from the total amount of available bandwidth that may be shared among other users. In other cases, malicious users may purposefully impact the quality of service delivered to other users, utilizing various tactics to degrade or even fully deny service. In some cases, the user may even be unaware that they have a virus that is causing the degradation of services for themselves and others.

SUMMARY

Various exemplary embodiments relate to a method performed by a network node for resolving network-related events, the method including one or more of the following: receiving, at the network node, an indication of an event from a network monitor, the event associated with a network element; identifying an applicable rule of a plurality of rules based on the event, the applicable rule specifying at least one action; and initiating performance of the at least one action with respect to at least one session associated with the network element.

Various exemplary embodiments relate to a network node for resolving network related events, the network node including one or more of the following: a network monitor interface for receiving an indication of an event from a network monitor, the event associated with a network element; a rules storage for storing a plurality of rules, each rule of the plurality of rule specifying at least one criteria and at least one action; and a rules engine configured to identify an applicable rule of the plurality of rules by comparing the event to the at least one criteria of the applicable rule.

Various exemplary embodiments relate to a tangible and non-transitory machine-readable storage medium encoded with instructions for execution by a network node for resolving network-related events, the tangible and non-transitory machine-readable storage medium including one or more of the following: instructions for receiving, at the network node, an indication of an event from a network monitor, the event associated with a network element; instructions for identifying an applicable rule of a plurality of rules based on the event, the applicable rule specifying at least one action; instructions for initiating performance of the at least one action with respect to at least one session associated with the network element.

Various embodiments are described wherein the step of initiating performance of the at least one action comprises: identifying a group of sessions associated with the network element; and initiating performance of the at least one action with respect to each session of the group of sessions.

Various embodiments additionally include identifying a group of sessions associated with the network element; and wherein the steps of identifying an applicable rule and initiating performance of the at least one action are performed for each session of the group of sessions.

Various embodiments additionally include one of more of the following: updating an object associated with the network element based on the event; receiving a request associated with a session associated with the network node; wherein the steps of identifying an applicable rule and initiating performance of the at least one action are performed in response to receiving the request.

Various embodiments additionally include receiving a second indication of a second event, the second event associated with a subscriber; wherein the step of identifying an applicable rule comprises identifying an applicable rule of the plurality of rules based on both the event and the second event.

Various embodiments are described wherein the indication of an event includes an indication of at least one of a presence of congestion, an intensity of utilization, and intensity of congestion, a number of active devices, a number of signaling events, and a number of failures.

Various embodiments are described wherein the network element is one of a gateway GPRS support node, a packet data serving node, a home agent, a serving GPRS support node, a packet data network gateway, a serving gateway, a radio network controller, a node B, an enodeB, an associated cell, and an associated sector.

BRIEF DESCRIPTION OF THE DRAWINGS

In order to better understand various exemplary embodiments, reference is made to the accompanying drawings, wherein:

FIG. 3 illustrates an exemplary data arrangement for storing network element objects;

FIG. 4 illustrates an exemplary data arrangement for storing subscriber objects;

FIG. 5 illustrates an exemplary rule set; and

DETAILED DESCRIPTION

Figure 1:
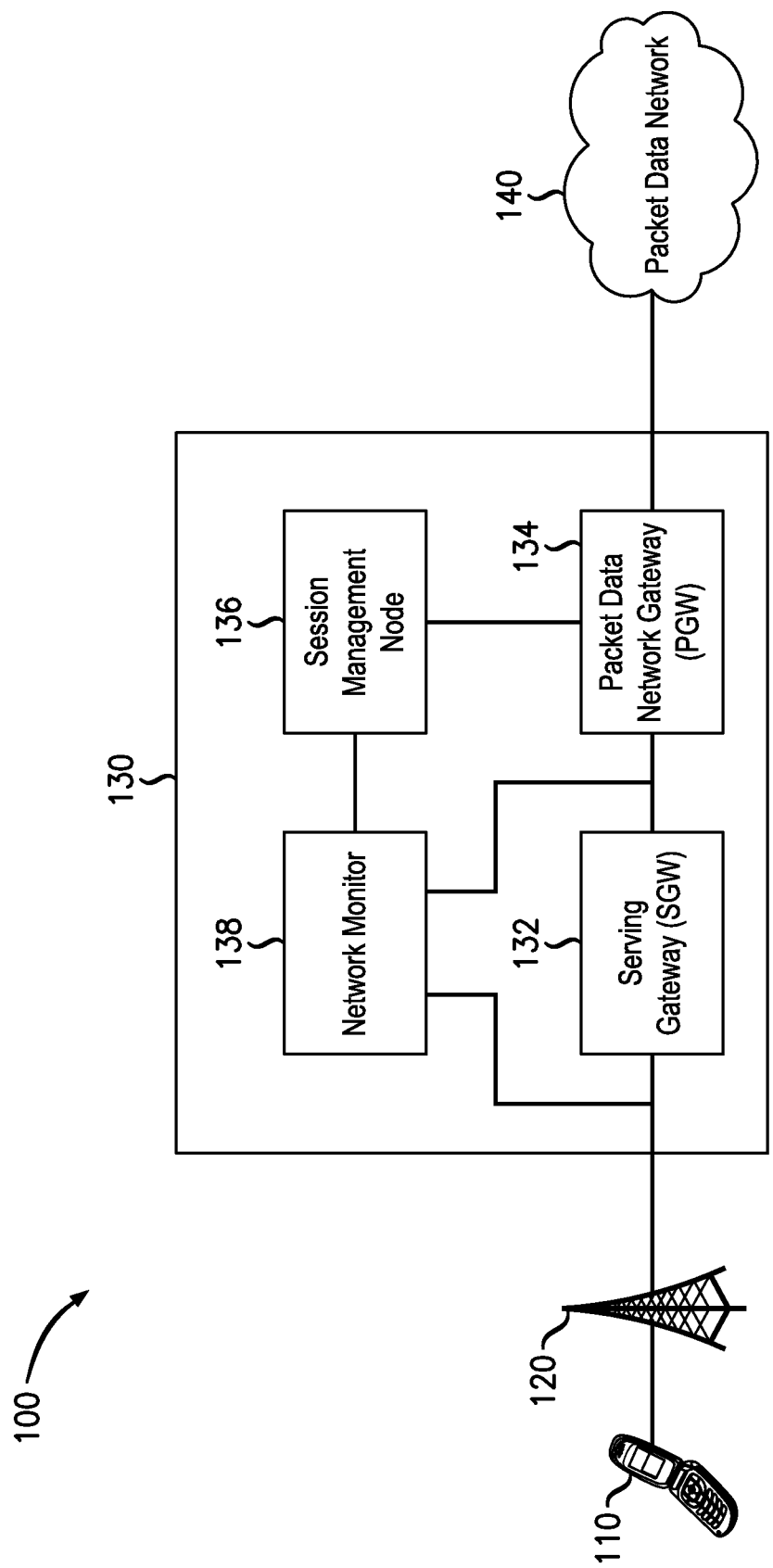
FIG. 1 illustrates an exemplary network for detecting and resolving network events.

In view of the foregoing, there exists a need for a system that may intelligently manage various events that may detract from user experience in a network. In particular, there is a need for various types of nodes that may receive an indication of a network event and respond to the event appropriately according to the various nodes' functions.

Referring now to the drawings, in which like numerals refer to like components or steps, there are disclosed broad aspects of various exemplary embodiments.

FIG. 1 illustrates an exemplary network 100 for detecting and resolving network events. Network 100 may include user equipment (UE) 110, base station 120, evolved packet core (EPC) 130, packet data network 140. It should be appreciated that, while various embodiments described herein relate to a Long Term Evolution (LTE) network as described by the third generation partnership project (3GPP), the methods and systems described herein may be implemented in virtually any network including, for example, a 2.5G CDMA network, a 3G/UMTSs network, a 4G network or a network access server (NAS). Various modifications appropriate for implementation within such alternative networks will be apparent to those of skill in the art.

User equipment (UE) 110 may be a device that communicates with packet data network 140 for providing the end-user with a data service. Such data service may include, for example, voice communication, text messaging, multimedia streaming, and Internet access. More specifically, in various exemplary embodiments, user equipment 110 is a personal or laptop computer, tablet, wireless email device, cell phone, smart phone, television set-top box, or any other device capable of communicating with other devices via EPC 130.

Base station 120 may be a device that enables communication between user equipment 110 and EPC 130. For example, base station 120 may be a base transceiver station such as an evolved node B (eNodeB) as defined by 3GPP standards. Thus, base station 120 may be a device that communicates with user equipment 110 via a first medium, such as radio communication, and communicates with EPC 130 via a second medium, such as Ethernet cable. Base station 120 may be in direct communication with EPC 130 or may communicate via a number of intermediate nodes (not shown) such as, for example, radio network controllers. In various embodiments, multiple base stations (not shown) may be present to provide mobility to user equipment 110. Note that in various alternative embodiments, user equipment 110 may communicate directly with evolved packet core. In such embodiments, base station 120 may not be present.

Packet core or evolved packet core (EPC) 130 may be a device or network of devices that provides user equipment 110 with gateway access to packet data network 140, EPC 130 may further charge a subscriber for use of provided data services and ensure that particular quality of experience (QoE) standards are met. Thus, EPC 130 may be implemented, at least in part, according to the 3GPP Technical Specifications (TS) 29.212, 29.213, and 29.214 standards. Accordingly, EPC 130 may include a serving gateway (SGW) 132, a packet data network gateway (PGW) 134, a session management node 136, and a network monitor 138. EPC 130 may contain numerous additional nodes (not shown) such as, for example, a subscription profile repository (SPR) and/or a mobility management entity (MME). It will be appreciated that in various embodiments, the components of network 100 may be arranged differently. For example, network monitor 138 may not be a part of EPC 130 and, instead, may monitor various traffic from outside EPC 130.

Serving gateway (SGW) 132 may be a device that provides gateway access to the EPC 130. SGW 132 may be the first device within the EPC 130 that receives packets sent by user equipment 110 and may forward such packets toward PGW 134. SGW 132 may perform a number of additional functions such as, for example, managing mobility of user equipment 110 between multiple base stations (not shown) and enforcing particular quality of service (QoS) characteristics, such as guaranteed bit rate, for each flow being served. In various implementations, such as those implementing the Proxy Mobile IP (PMIP) standard, SGW 132 may include a Bearer Binding and Event Reporting Function (BBERF). In various exemplary embodiments, EPC 130 may include multiple SGWs (not shown) and each SGW may communicate with multiple base stations (not shown).

Packet data network gateway (PGW) 134 may be a device that provides gateway access to packet data network 140. PGW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Thus, PGW 134 may be a policy and charging enforcement node (PCEN). PGW 134 may include a number of additional features such as, for example, packet filtering, deep packet inspection, and subscriber charging support.

Session management node 136 may be a device that establishes and manages various sessions for user equipment such as UE 110 within EPC 130. Such sessions may include, for example, IP connectivity access network (IP-CAN) sessions and service data flows (SDFs). In various embodiments, session management node may implement a policy and charging rules function (PCRF) and, therefore, may be referred to as a policy and charging rules node (PCRN). According to various implementations, session management node 136 may receive various request messages from PGW 134. Such request messages may request the establishment, modification, and termination of various sessions. In response, session management node 136 may fulfill such requests by installing policy and charging control (PCC) rules at PGW 134.

Network monitor 138 may be a device adapted to monitor one or more portions of network 100 for various network- and subscriber-related events. As illustrated, network monitor 138 monitors connections between base station 120 and SGW 132 and between SGW 132 and PGW 134. It should be noted, however, that network monitor 138 may be adapted to monitor any combination of connections within network 100. For example, network monitor 138 may monitor connections such as connections between UE 110 and base station 120 and/or connections between sectors and/or cells within base station 120. Further, network 100 may contain numerous additional network monitors (not shown) in communication with EPC 130.

Network monitor 138 may detect network-related events such as congestion or utilization on a particular network element. For example, network monitor 138 may monitor the throughput of serving gateway 132 and determine that the element is congested when the throughput exceeds a predetermined threshold or when the rate of incoming traffic is significantly higher than the rate of outgoing traffic. Network monitor 138 may detect a number of different types of network-related events such as, for example, element signaling and element failures. Various additional events and methods for detection of such will be apparent to those of skill in the art.

Network monitor 138 may additionally detect subscriber-related events. For example, network monitor may determine that the user of UE 110 is a high usage subscriber by monitoring the portion of traffic associated with the subscriber as compared to a predetermined threshold or the average portion of traffic dedicated to a subscriber. Network monitor 138 may also monitor for discrete events that may be indicative of a malicious user. For example, network monitor 138 may log each user that attempts a horizontal or vertical port scan. Network monitor 138 may detect a number of additional types of subscriber-related events such as, for example, signal attacks, battery attacks, peer to peer traffic, always-active subscribers, high-signaling subscribers, unwanted sources, flooding, discovery abuse, and/or signaling abuse. Various additional events and methods for detection of such will be apparent to those of skill in the art.

Upon detection of a network- or subscriber-related event, network monitor 138 may send a notification to session management node 136. Such notification may include an identification of the observed event as well as additional information. In the case of a network-related event, the message may include information such as an identification of the affected network elements (for example, SGWs, PGWs, NodeBs, cells, etc.), an estimation of event intensity, a number of devices currently served by the network element, a number of signals observed with respect to the network element, and/or a number of failures or other errors occurring at the network element. In the case of a subscriber-related event, the notification may include a subscriber identifier, an estimation of event intensity, and/or an access point name.

In the case of both network- and subscriber-related events, network monitor 138 may further be capable of communicating the end of an event. For example, if network monitor 138 detects that the throughput of SGW 132 has dropped below the congested threshold, network monitor may transmit a message to session management node 136 indicating that SGW 132 is no longer congested.

In response to various messages sent by network monitor 138, session management node 136 may be adapted to take remedial action. In various embodiments, upon receiving a network-related event message, session management node 136 may modify each session associated with the affected network element by, for example, moving the session to a different network element, throttling the connection speed or even notification towards the subscriber (email or SMS). In response to subscriber-related events, session management node 136 may take similar remedial action with respect to sessions associated with the offending subscriber. Additionally or alternatively, session management node 136 may store the reported event data for later use. For example, upon receiving a request for a new session through a congested node, session management node 136 may propose an alternate route around the congested node or may only approve the session at a reduced bandwidth.

Packet data network 140 may be any network for providing data communications between user equipment 110 and other devices connected to packet data network 140 such as, for example, nodes including an application function (AF). In various embodiments, packet data network 140 may include the Internet. Packet data network 140 may further provide, for example, phone and/or Internet service to various user devices in communication with packet data network 140.

As previously noted, while various embodiments herein relate to improvements for a session management node such as a PCRN, the improvements detailed herein may be applied to other devices and/or environments. For example, various nodes such as deep packet inspection (DPI) devices, video optimizers, traffic steering applications, customer care applications, caching and streaming functions, analytics and reporting engines, and/or content optimization and enrichment devices may benefit from resolving various reported events in manners similar to those described herein. Various modifications appropriate for such applications will be apparent to those of skill in the art.

Figure 2:
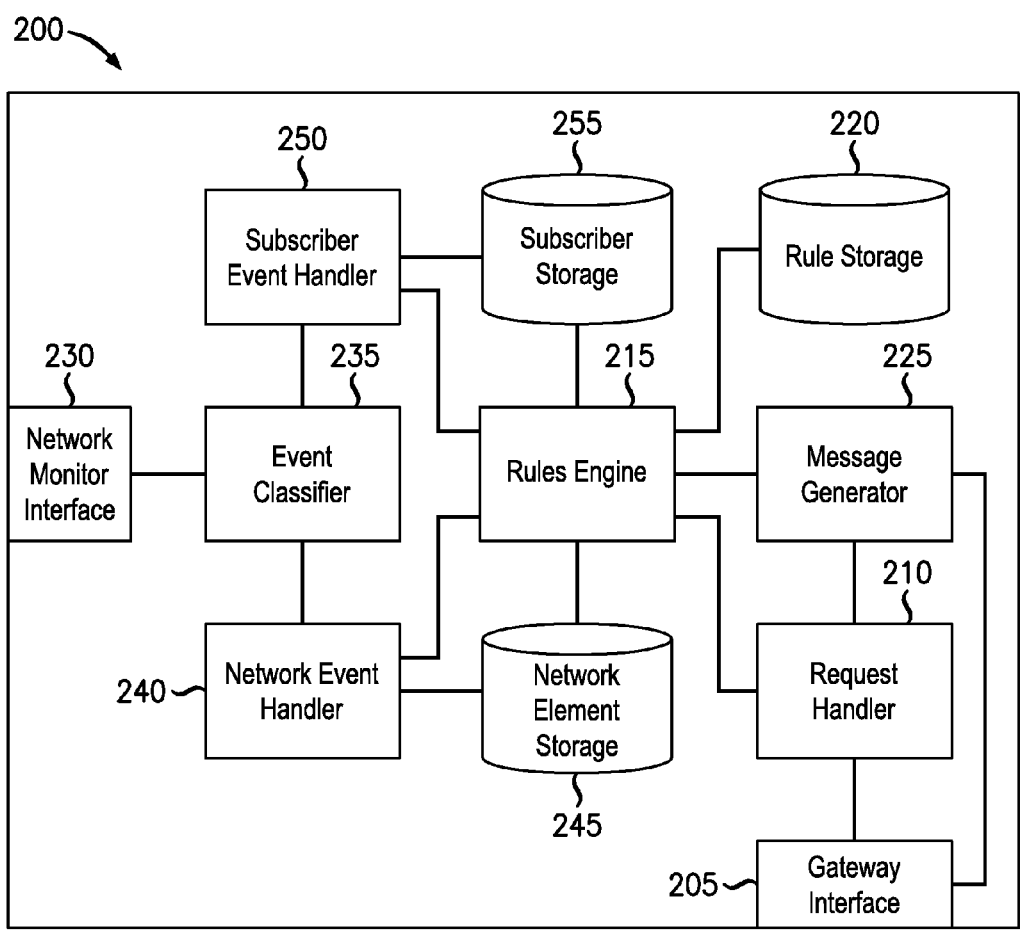
FIG. 2 illustrates an exemplary network node for resolving network events.

FIG. 2 illustrates an exemplary network node 200 for resolving network events. In various embodiments network node 200 may correspond to session management node 136 of exemplary network 100. In various alternative embodiments, network node 200 may correspond to another type of device. In such embodiments, various components illustrated may not be present. Exemplary network node 200 may include a gateway interface 205, request handler 210, rules engine 215, rule storage 220, message generator 225, network monitor interface 230, event classifier 235, network event handler 240, network element storage 245, subscriber event handler 250, and subscriber storage 255.

Gateway interface 205 may be an interface comprising hardware and/or executable instructions encoded on a machine-readable storage medium configured to communicate with other network nodes such as, for example, PGW 134. In various embodiments, gateway interface 205 may communicate with some nodes according to the Diameter and/or RADIUS protocols. Accordingly gateway interface 205 may include at least one Ethernet network interface device.

Request handler 210 may include hardware and/or executable instructions on a machine-readable storage medium configured to process various requests related to various sessions received via gateway interface 205. For example, request handler 210 may establish, modify, and/or terminate IP-CAN sessions and SDFs upon request by another node. In fulfilling such requests, request handler 210 may request one or more rule results from rules engine 215. For example, request handler 210 may request one or more attribute values to be used in fulfilling a request or may request a determination of some other action to take with respect to the request. Upon receiving a rule result, request handler 215 may process the result by initiating performance of the specified action locally or by determining that network node 200 should initiate performance of the action at a different node. Once request handler 210 appropriately processes a request, request handler 210 may indicate to message generator 225 that one or more messages should be transmitted via gateway interface 205 to one or more other nodes to initiate performance of one or more actions specified by a rules result, to effect fulfillment of the request, and/or to otherwise notify other nodes of request fulfillment. For example, request handler 210 may indicate to message generator 225 that a PCC rule should be installed at a particular PGW.

Rules engine 215 may include hardware and/or executable instructions on a machine-readable storage medium configured to, upon request by another component, locate an applicable rule stored in rule storage 220 and return a rule result to the requesting component. In various embodiments, each rule stored in rule storage 220 may indicate various criteria for determining whether the rule is applicable. Rules engine 215 may make use of any context data available in evaluating various rule criteria. Various examples of context information may include data carried by an event notification, data carried by a received request, a current time and date, subscriber objects stored in subscriber storage 255, network element objects stored in network element storage 245, data stored in a subscription profile repository, and/or system operating parameters.

Each rule stored in rule storage 220 may additionally include one or more results indicating actions to be taken such as, for example, setting an attribute to a particular value when fulfilling a request or terminating a particular session. Upon identifying an applicable rule, rules engine 215 may return the entire rule or just the rule result to the requesting component for further processing.

Rules engine 215 may process different rule tables based on the context of the request. For example, rules engine 215 may only consider rules belonging to a first rule table when a rule result is requested for an IP-CAN session establishment request while rules engine 215 may only consider rules belonging to a second rule table when a rule result is requested in response to the receipt of an event indication via network monitor interface 230. Additional rule tables may be defined for other contexts such as, for example, IP-CAN session modification, SPR notifications, rule creation, application function (AF) session creation, AF session modification, and/or QoS management.

Rule storage 220 may be any machine-readable medium capable of storing various rule sets for application by rules engine 220. Accordingly, rule storage 220 may include a machine-readable storage medium such as read-only memory (ROM), random-access memory (RAM), magnetic disk storage media, optical storage media, flash-memory devices, and/or similar storage media. In various alternative embodiments, rule storage 220 may be an external device which may be accessed by one or more network nodes such as network node 200. An exemplary rule set is described in further detail below with respect to FIG. 5.

Message generator 225 may include hardware and/or executable instructions on a machine-readable storage medium configured to generate various messages for transmission to other network nodes via gateway interface 205. In various embodiments wherein network node 200 communicates with other nodes using the Diameter protocol, message generator 225 may be configured to construct reauthorization requests (RARs) and credit control answers (CCAs). Upon instruction by another component such as request handler 210, for example, message generator may construct a message to install one or more PCC rules at a PGW. Message generator 225 may additionally or alternatively be configured to propagate event information to other network nodes.

Network monitor interface 230 may be an interface comprising hardware and/or executable instructions encoded on a machine-readable storage medium configured to communicate with one or more network monitors such as network monitor 138. In various embodiments, such communication may include various event reports transmitted by network monitors and may occur according to the representational state transfer (REST) paradigm. Accordingly network monitor interface 230 may include at least one Ethernet network interface device. In various embodiments, network monitor interface 230 may be the same component as gateway interface 205.

Event classifier 235 may include hardware and/or executable instructions on a machine-readable storage medium configured to receive an indication of an event via network monitor interface 230 and forward the indication to an appropriate handler. Accordingly, event classifier 235 may examine one or more fields of an event indication to determine whether the event is related to a network node, subscriber, or some other entity. For example, event classifier 235 may include a lookup table that relates the value of an event type field to a proper component for processing the indication. Alternatively, each indication may carry an identifier that specifically indicates that the event is network-related or subscriber-related. Various alternative methods for relating an indication to an appropriate handler will be apparent to those of skill in the art.

Upon determining that a received indication describes a network-related event, event classifier 235 may forward the indication to network event handler 240. Likewise, upon determining that a received indication describes a subscriber-related event, event classifier 235 may forward the indication to subscriber event handler 250. If the indication is related to a different entity or unrelated to any specific entity, event classifier 235 may forward the indication to some other appropriate handler component (not shown) or may simply ignore the indication.

Network event handler 240 may include hardware and/or executable instructions on a machine-readable storage medium configured to process a received indication of a network-related event. Upon receiving such an indication, network event handler 240 may identify one or more network elements affected by the event by, for example, extracting one or more network element identifiers from the indication. Network event handler 240 may then locate the corresponding network element objects in network element storage and update the objects based on the indication. For example, if the indication informs network event handler 240 that the network is experiencing congestion between network elements 0x4E33 and 0x73AD, network event handler 240 may update the objects associated with those network elements to reflect the congestion. Thereafter, rules engine 215 may use the updated objects in making decisions with respect to various sessions.

Network event handler 240 may additionally or alternatively take immediate action in response to receiving the event indication. For example, network event handler 240 may request one or more rule results from rules engine 215 to determine what actions should be taken in response to the event indication. In various embodiments, network event handler 240 may identify all sessions currently known to network node 200 as using the affected network nodes or that would otherwise be impacted by the event. Network event handler 240 may then iterate through each session and request a rule result from rules engine 215 for each session. Alternatively, rules engine may request one rule result to be applied with respect to all affected sessions. Upon receiving a rule result, network event handler 240 may initiate performance of any actions specified by the rule result, locally and/or at other network nodes, including, if appropriate, notifying message generator 225 that one or more messages should be constructed and transmitted to other network nodes.

Network element storage 245 may be any machine-readable medium capable of storing objects representing various network elements. Accordingly, network element storage 245 may include a machine-readable storage medium such as read-only memory (ROM), random-access memory (RAM), magnetic disk storage media, optical storage media, flash-memory devices, and/or similar storage media. In various alternative embodiments, network element storage 245 may be an external device which may be accessed by one or more network nodes such as network node 200. In various embodiments, network element storage 245 may be the same device as rule storage 220. An exemplary data structure for storing network element objects is described in further detail below with respect to FIG. 3.

Subscriber event handler 250 may include hardware and/or executable instructions on a machine-readable storage medium configured to may include hardware and/or executable instructions on a machine-readable storage medium configured to process a received indication of a subscriber-related event. Upon receiving such an indication, subscriber event handler 250 may identify one or more subscribers affected by the event by, for example, extracting one or more subscriber identifiers from the indication. Subscriber event handler 250 may then locate the corresponding subscriber objects in network element storage and update the objects based on the indication. For example, if the indication informs subscriber event handler 250 that subscriber 0x563C90 has been identified as a high usage subscriber, subscriber event handler 250 may update the objects associated with that subscriber to reflect the new status. Thereafter, rules engine 215 may use the updated object in making decisions with respect to various sessions.

Subscriber event handler 250 may additionally or alternatively take immediate action in response to receiving the event indication. For example, subscriber event handler 250 may request one or more rule results from rules engine 215 to determine what actions should be taken in response to the event indication. In various embodiments, subscriber event handler 250 may identify all sessions currently known to network node 200 as being associated with the identified subscriber. Subscriber event handler 250 may then iterate through each session and request a rule result from rules engine 215 for each session. Alternatively, rules engine may request one rule result to be applied with respect to all affected sessions. Upon receiving a rule result, subscriber event handler 250 may initiate performance of any actions specified by the rule result, locally and/or at other network nodes, including, if appropriate, notifying message generator 225 that one or more messages should be constructed and transmitted to other network nodes.

Subscriber storage 255 may be any machine-readable medium capable of storing objects representing various subscribers. Accordingly, subscriber storage 255 may include a machine-readable storage medium such as read-only memory (ROM), random-access memory (RAM), magnetic disk storage media, optical storage media, flash-memory devices, and/or similar storage media. In various alternative embodiments, subscriber storage 255 may be an external device which may be accessed by one or more network nodes such as network node 200. In various embodiments, subscriber storage 255 may be the same device as rule storage 220 and/or network element storage 245. In some embodiments, subscriber storage 255 may be a subscription profile repository (SPR). An exemplary data structure for storing subscriber objects is described in further detail below with respect to FIG. 4.

FIG. 3 illustrates an exemplary data arrangement 300 for storing network element objects. Data arrangement 300 may be a table in a database or cache such as network element storage 245. Alternatively, data arrangement 300 may be a series of linked lists, an array, or a similar data structure. Thus, it should be apparent that data arrangement 300 is an abstraction of the underlying data; any data structure suitable for storage of this data may be used.

Data arrangement 300 may include numerous fields. In the illustrated example, data arrangement includes network element ID field 305, congestion field 310, active mobiles field 315, signaling events field 320, and failures field 325. Various embodiments may omit some of these fields and/or may include additional fields (not shown).

Network element ID field 305 may store an identifier for a network element represented by each object. Such network elements may be any type of network element such as, for example, a base station, radio network controller, home agent, SGW, PGW, and/or cells or sectors associated with such equipment. Congestion field 310 may indicate the presence of congestion with respect to the network element represented by an object. For example, congestion field 310 may include a set of network element identifiers, indicating that congestion has been reported between the element represented by the object and the elements identified in the set. Alternatively, congestion 310 may store a congestion intensity along with each network element identifier or may simply indicate the presence of congestion without specifying any additional network element identifiers.

Active mobiles field 315 may store a count of mobile devices currently being served by the network element. Signaling events field 320 may store a count of signaling events observed with respect to the network element. Such count may be a total count of signaling events observed since installation or since the last reset or may be a count of signaling events observed over a most recent predefined time window. Failures field 325 may store a count of failures observed with respect to the network element. Like signaling events field 320, such count may be a total count of signaling failures observed since installation or since the last reset or may be a count of failures observed over a most recent predefined time window.

As an example, network element object 330 indicates that NE 0x4E33 is currently serving 15 mobile devices, has experienced 23 signaling events, and has had 4 failures. NE 0x4E33 is currently experiencing congestion on its link toward NE 0x73AB. As another example, network element object 340 indicates that NE 0x73AB is currently serving 65 mobile devices, has experienced 43 signaling events, and has had 5 failures. NE 0x73AB is also experiencing congestion on its links toward NEs 0x4E33 and 0x540D. As yet another example, network element object 350 indicates that NE 0xF406 is not currently experiencing any congestion, is currently serving 9 mobile devices, has experienced 24 signaling events, and has had 1 failure. Data arrangement 300 may contain numerous additional network element objects 360.

FIG. 4 illustrates an exemplary data arrangement 400 for storing subscriber objects. Data arrangement 400 may be a table in a database or cache such as subscriber storage 255 and/or an SPR (not shown). Alternatively, data arrangement 400 may be a series of linked lists, an array, or a similar data structure. Thus, it should be apparent that data arrangement 400 is an abstraction of the underlying data; any data structure suitable for storage of this data may be used.

Data arrangement 400 may include numerous fields. In the illustrated example, data arrangement includes subscriber ID field 405 and anomalies field 410. Various embodiments may omit some of these fields and/or may include additional fields (not shown).

Subscriber ID field 405 may store an identifier for a subscriber represented by an object. In various embodiments, each subscriber may be associated with multiple types of identifiers. In such embodiments, data arrangement may include multiple subscriber id fields (not shown) for storing such varying subscriber identifiers. Anomalies field 410 may store a set of anomalies detected for each subscriber. In various embodiments, anomalies field 410 may also store a reported intensity along with each anomaly. Such reported anomalies may include, for example, identification as a high usage subscriber or detection of a port scan.

As an example, subscriber object 420 indicates that subscriber 0x563C90 has been identified as a high usage subscriber. As another example, subscriber object 430 indicates that subscriber 0x7EF521 has been identified a using a peerto-peer mobile application and has initiated a horizontal port scan. Data arrangement 400 may contain numerous additional subscriber objects 440.

FIG. 5 illustrates an exemplary rule set 500. Rule set 500 may be a table in a database or cache such as rule storage 220. Alternatively, rule set 500 may be a series of linked lists, an array, or a similar data structure. Thus, it should be apparent that rule set 500 is an abstraction of the underlying data; any data structure suitable for storage of this data may be used.

Rule set 500 may include a number of rule tables. Each rule table may include a number of rules that may be applicable in particular contexts. For example, rule table 505 includes a number of rules that may be applied in response to a network node receiving an indication of an event from a network monitor such as network monitor 138. As another example, rule table 540 includes a number of rules that may be applied in response to a request for establishment of a session. Rule set 500 may include numerous additional rule tables 565.

Each rule table may include a plurality of rules. Each rule may include a number of fields. For example, in the illustrated rule tables, each rule includes a criteria field 510 and a result field 515. Criteria field 510 may store a number of conditions that, if present, indicate that a particular rule is applicable. Such conditions may make use of a variety of context information, including any information carried by an event indication received from a network monitor, network element objects, and/or subscriber objects. Result field 515 may indicate one or more actions that should be performed when a rule is applicable. Such actions may include terminating a session, moving a session, throttling a connection, and/or using a particular value for an attribute such as a QoS attribute.

The rules within each rule set may be ordered in terms of precedence. Accordingly, if multiple criteria are met for multiple rules, a rules engine may only return the first matching rule as such a rule may carry the highest precedence. In various alternative embodiments, however, rules engine may be configured to return all matching rules, rather than only the highest precedence rule.

As an example, rule table 505 includes a number of rules. Rule 520 may indicate that if a reported event indicates that a subscriber has been identified as a peer-to-peer user, peer-to-peer sessions associated with that subscriber should be throttled to 10% of the bandwidth normally available to that subscriber. Rule 525 may indicate that if a reported event indicates that a subscriber has been identified as a high usage subscriber and if any NE serving that subscriber is currently congested, the subscriber sessions should be moved so they are served by a different NE. Rule 530 may indicate that if a reported event indicates that a particular NE is congested, any sessions associated with the NE should be reauthorized. Such reauthorization may include additional invocations of the rules engine under a session reauthorization context. Rule table 505 may include numerous additional rules 535.

As another example, rule table 540 may also contain numerous rules. Rule 545 may indicate that if the subscriber requesting establishment of a session is currently identified as a high usage subscriber, the session should be established but throttled to 50% of the bandwidth normally available to that subscriber for such a session. Rule 550 may indicate that if an NE that would serve the session is currently identified as congested and if the requesting subscriber has a subscriber category of "Gold," the session should be established as normal. Rule 555 may indicate that if an NE that would serve the session is currently identified as congested, the session should be established but throttled to 80% of the bandwidth normally available to that subscriber for such a session. Note here that, in various embodiments implementing rule precedence, rule 555 may only be evaluated if the criteria for rule 550 are not met. Accordingly, rule 555 may be applied for subscriber categories of "silver" or "bronze," but not "gold." Rule table 540 may include numerous additional rules 560.

Figure 6:
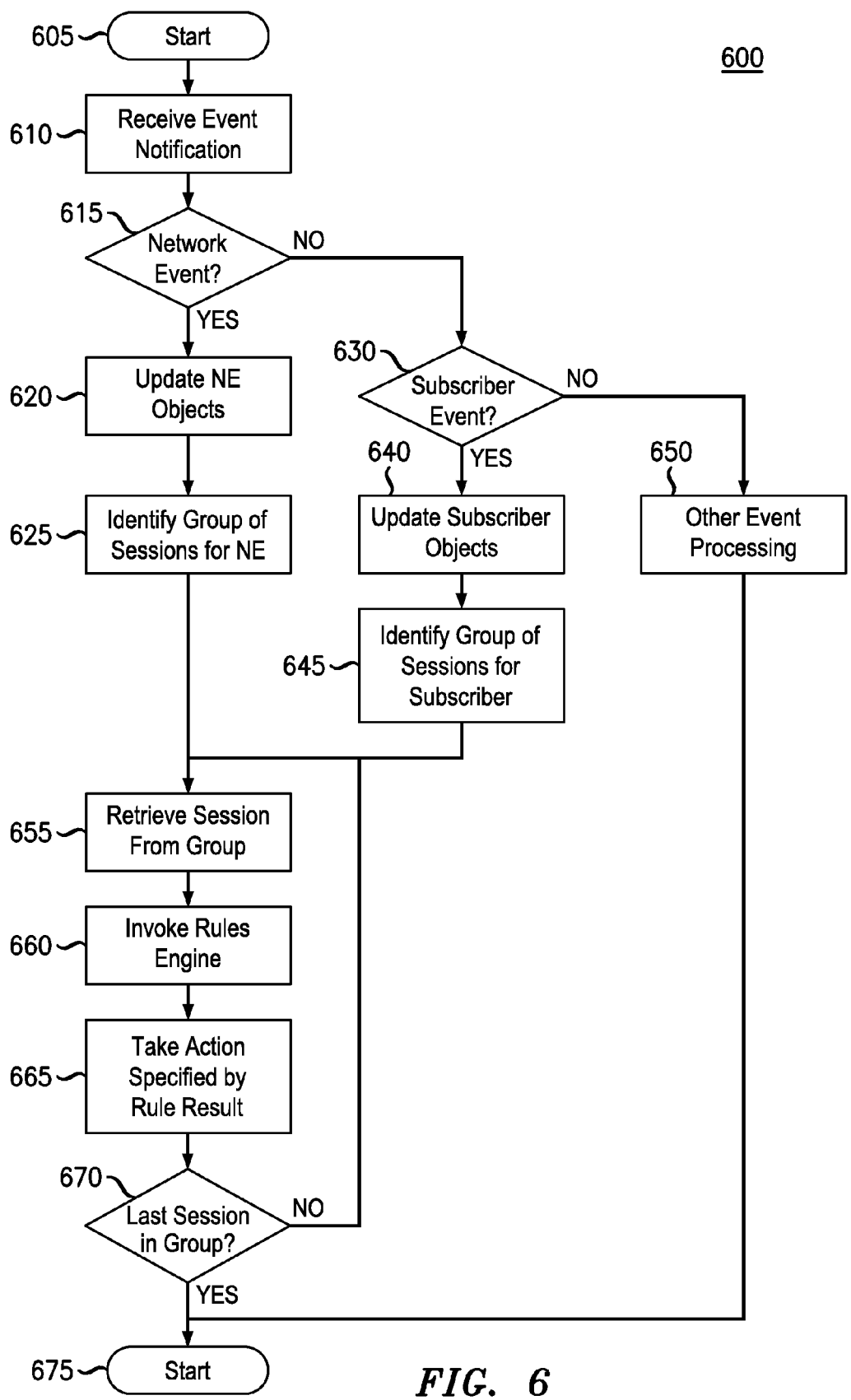
FIG. 6 illustrates an exemplary method for resolving network events.

FIG. 6 illustrates an exemplary method 600 for resolving network events. Method 600 may be performed by the components of network node 200 such as, for example, rules engine 215, event classifier 235, network event handler 240, and/or subscriber event handler 250.

Method 600 may begin in step 605 and proceed to step 610 where network node 200 may receive an event notification from a network monitor device. Next, in step 615, network node 200 may determine whether the event notification includes an indication of a network-related event. For example, network node 200 may extract an event type from the event notification and/or reference a lookup table. If the event notification indicates a network-related event, method 600 may proceed to step 620 where network node 200 may locate and update one or more NE objects in view of the reported event. For example, if the event indicates congestion between two NEs, network node 200 may update the objects associated with those NEs to reflect the congestion. Method 600 may then proceed to step 625, where network node 200 identifies a group of sessions served by, or otherwise associated with, any of the affected NEs. After constructing this group, method 600 may proceed to step 655.

If, on the other hand, network node 200 determines at step 615 that the event notification does not indicate a network-related event, method 600 may instead proceed to step 630, where network node 200 may determine whether the event notification includes an indication of a subscriber-related event. Again, network node 200 may make or may have made this determination by extracting an event type from the event notification and/or referencing a lookup table. Next, in step 640, network node 200 may update an object associated with the subscriber identified by the event notification. For example, if the event notification indicates that a subscriber has been identified as a high usage subscriber, network node 200 may update the object the represents that subscriber to reflect the new status. Method 600 may then proceed to step 645 where network node 200 identifies a group of sessions established by, or otherwise associated with, the affected subscriber. After constructing this group, method 600 may proceed to step 655.

If, on the other hand, network node 200 determines at step 630 that the event notification does not indicate a subscriber-related event, method 600 may instead proceed to step 650, where network node 200 may perform other processing with respect to the event. For example, network node 200 may store an indication of the event in some other data structure and/or invoke the rules engine with regard to a number of affected sessions. After completion of such processing, method 600 may end in step 675.

In step 655, network node 200 may retrieve a session from the group of sessions (created in either step 625 or 645) to process. Next, in step 660, network node 200 may invoke the rules engine with respect to the session. Thus, network node 200 may retrieve a rule result indicating a particular action to take with respect to the session. Accordingly, in step 665, network node 200 may take any actions specified by the rule result such as, for example, modifying a PCC rule or terminating a connection. Next, in step 670, network node 200 may determine whether the just-processed session was the last session in the group. If more sessions remain to be processed, method 600 may loop back to step 655. Otherwise, method 600 may proceed to end in step 675.

Having described exemplary components and methods for the operation of exemplary network 100 and network node 200, an example of the operation of exemplary network 100 and network node 200 will now be provided with reference to FIGS. 1-6. For the purposes of this example, network node 200 may correspond to session management node 136; data arrangement 300 may indicate the contents of network element storage 245; data arrangement 400 may indicate the contents of subscriber storage 220; rule set 500 may indicate the contents of rule storage 220; and method 600 may describe the operation of network node 200.

The process may begin in step 610, where event classifier 235 receives an event indication from network monitor 138 via network monitor interface 230. Event classifier 235 extracts an event type from the event indication and determines that the event is a congestion event, which is a network-related event. Accordingly, event classifier 235 passes the event indication to network event handler 240. Network event handler 240 extracts two network element identifiers, 0x73AB and 0xF406, from the event indication and updates network element objects 340 and 350 accordingly in step 620. In particular, network event handler 240 updates congestion field 310 of network element object 340 to store the set {0x4E33; 0x540D; 0xF406}. Likewise, network event handler 240 updates congestion field 310 of network element object 350 to store the set {0x73AB}. Network event handler 240 determines that only a single session is served by these two NEs and requests a rule result from rules engine 215 in step 660 with respect to that session. Rules engine 215 then evaluates rule table 505 because the request for a rule result was made in response to a network monitor event. Rules engine 215 determines that rule 530 is applicable to the current context because the event indication was of a congested NE. Accordingly, rules engine indicates that the session should be reauthorized. Thus, in step 665, network event handler 240 may take additional steps necessary or useful in reauthorizing a session such as, for example, invoking the rules engine for additional instruction and/or instructing message generator 225 to install an updated PCC rule at an appropriate PGW.

Subsequently, subscriber 0x563C90 may request establishment of a new session. Accordingly, request handler 210 may receive this request via gateway interface 205. In fulfilling the request, request handler may request a rule result from rules engine 215. This time, rules engine 215 may evaluate rule table 540 because the request for a rule result was made in response to a request for a new session. Rule engine 215 may determine that, because subscriber object 420 indicates that subscriber 0x563C90 is a high usage subscriber, rule 545 is applicable. Thus, rule engine 215 may indicate to request handler that the session should be established but throttled to 50% of the bandwidth that would otherwise be provided. Request handler 210 may then construct a PCC rule accordingly and instruct message generator 225 to install the PCC rule at PGW 134.

According to the foregoing, various embodiments enable the intelligent management of a network, responsive to various network- and subscriber-related events. In particular, by analyzing reported events and storing indications of such events in relation to network elements and subscribers, a network node may take such information into account during its normal operation. Further, by invoking a rules engine upon receipt of an event report with respect to affected sessions, a network node may take immediate remedial action.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method performed by a session management node of a subscriber network for resolving network-related events, the method comprising:
   receiving, at the session management node, an indication of an event from a network monitor, the event associated with a network element;
   identifying a group of sessions associated with the network element;
   identifying, based on the event, an applicable rule of a plurality of rules that is applicable to a first session of the group of sessions, wherein the applicable rule includes: a first portion that includes a reference to the event, and a second portion specifying at least one action;
   initiating performance of the at least one action with respect the first session associated with the network element; and
   repeating the steps of identifying an applicable rule and initiating performance of the at least one action for a second session of the group of sessions.

2. The method of claim 1, wherein the steps of identifying an applicable rule and initiating performance of the at least one action are performed for each session of the group of sessions.

3. The method of claim 1, further comprising:
   updating an object associated with the network element based on the event; and
   receiving a request associated with a session associated with the session management node,
   wherein the steps of identifying an applicable rule and initiating performance of the at least one action are performed in response to receiving the request.

4. The method of claim 1, further comprising:
   receiving a second indication of a second event, the second event associated with a subscriber, wherein the step of identifying an applicable rule comprises identifying an applicable rule of the plurality of rules based on both the event and the second event.

5. The method of claim 1, wherein the indication of an event includes an indication of at least one of a presence of congestion, an intensity of utilization, and intensity of congestion, a number of active devices, a number of signaling events, and a number of failures.

6. The method of claim 1, wherein the network element is one of a gateway GPRS support node, a packet data serving node, a serving GPRS support node, a home agent, a packet data network gateway, a serving gateway, a radio network controller, a node B, an enodeB, an associated cell, and an associated sector.

7. A session management node of a subscriber network for resolving network related events, the session management node comprising:
a network monitor interface for receiving an indication of an event from a network monitor, the event associated with a network element;
a rules storage for storing a plurality of rules, each rule of the plurality of rules specifying at least one criteria and at least one result;
a rules engine configured to identify an applicable rule of the plurality of rules by comparing the event to the at least one criteria of the applicable rule, wherein:
the at least one criteria of the applicable rule includes a reference to the event, and
the at least one result of the applicable rule specifies at least one action to be performed; and
a network event handler configured to
identify a group of sessions associated with the network element, node; and
request an identification of an applicable rule from the rules engine for a first session of the group of sessions,
initiate performance of at least one action identified by the applicable rule for the at least one session of the group of sessions, and
repeat the steps of requesting and initiating for a second session of the group of sessions.

8. The session management node of claim 7, further comprising:
a network element storage for storing a plurality of network element objects, each network element object associated with a network element; and
a network event handler configured to update a network element object of the plurality of network element objects associated with the network element based on the event,
wherein the rules engine, in comparing the event to the at least one criteria, is configured to access the network element object from the network element storage.

9. The session management node of claim 7, further comprising:
an interface for receiving a request associated with a session;
a request handler configured to, in response to receiving the request, initiate performance of the at least one action identified by the rules engine.

10. The session management node of claim 7, wherein:
the network monitor interface further receives a second indication of a second event, the second event associated with a subscriber; and
in identifying an applicable rule, the rules engine is configured to identify an applicable rule of the plurality of rules by comparing both the event and the second event to the at least one criteria of the applicable rule.

11. A non-transitory machine-readable storage medium encoded with instructions for execution by a session management node of a subscriber network for resolving network-related events, the non-transitory machine-readable storage medium comprising:
instructions for receiving, at the session management node, an indication of an event from a network monitor, the event associated with a network element;
instructions for identifying a group of sessions associated with the network element;
instructions for identifying, based on the event, an applicable rule of a plurality of rules that is applicable to a first session of the group of sessions, wherein the applicable rule includes:
a first portion that includes a reference to the event, and
a second portions specifying at least one action; and
instructions for initiating performance of the at least one action with respect to the first session associated with the network element; and
instructions for repeating the instructions for identifying an applicable rule and initiating performance of the at least one action for a second session of the group of sessions.

12. The non-transitory machine-readable storage medium of claim 11, further comprising:
wherein the instructions for repeating the instructions for identifying an applicable rule and initiating performance of the at least one action for a second session comprise instructions for iterating through each session of the group of sessions.

13. The non-transitory machine-readable storage medium of claim 11, further comprising:
instructions for updating an object associated with the network element based on the event; and
instructions for receiving a request associated with a session associated with the session management node,
wherein the instructions for identifying an applicable rule and initiating performance of the at least one action are executed in response to receiving the request.

14. The non-transitory machine-readable storage medium of claim 11, further comprising:
instructions for receiving a second indication of a second event, the second event associated with a subscriber,
wherein the instructions for identifying an applicable rule comprise instructions for identifying an applicable rule of the plurality of rules based on both the event and the second event.

15. The non-transitory machine-readable storage medium of claim 11, wherein the indication of an event includes an indication of at least one of a presence of congestion, an intensity of utilization, and intensity of congestion, a number of active devices, a number of signaling events, and a number of failures.

16. The non-transitory machine-readable storage medium of claim 11, wherein the network element is one of a gateway GPRS support node, a packet data serving node, a serving GPRS support node, a home agent, a packet data network gateway, a serving gateway, a radio network controller, a node B, an enodeB, an associated cell, and an associated sector.

17. The method of claim 1, wherein the reference to the event included in the first portion of the applicable rule comprises a conditional statement that tests a property of the event.

18. The session management node of claim 7, wherein the reference to the event included in the first portion of the applicable rule comprises a conditional statement that tests a property of the event.

19. The non-transitory machine-readable storage medium of claim 11, wherein the reference to the event included in the first portion of the applicable rule comprises a conditional statement that tests a property of the event.

* * * * *